(12) United States Patent
Hinckley et al.

(10) Patent No.: US 6,972,749 B2
(45) Date of Patent: Dec. 6, 2005

(54) TOUCH-SENSITIVE DEVICE FOR SCROLLING A DOCUMENT ON A DISPLAY

(75) Inventors: Kenneth P. Hinckley, Redmond, WA (US); Hugh E. McLoone, Redmond, WA (US); Steven N. Bathiche, Redmond, WA (US); James H. Cauthorn, Seattle, WA (US); Stiven Kerestegian, Seattle, WA (US); Timothy Michael Muss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 09/940,900

(22) Filed: Aug. 29, 2001

(65) Prior Publication Data

US 2003/0043123 A1   Mar. 6, 2003

(51) Int. Cl.[7] .............................................. G09G 5/00
(52) U.S. Cl. .................... 345/173; 345/156; 345/168
(58) Field of Search ........................ 345/173, 156–157, 345/684, 685, 168–169, 784–788; 341/20, 341/22–23; 400/472, 477; D14/391–394; 348/334

(56) References Cited

U.S. PATENT DOCUMENTS

| | | | |
|---|---|---|---|
| D357,011 S | | 4/1995 | Paull et al. |
| D357,476 S | | 4/1995 | Paull et al. |
| D370,477 S | * | 6/1996 | Chen .......................... D14/393 |
| D387,340 S | * | 12/1997 | Pham ......................... D14/393 |
| 5,748,185 A | | 5/1998 | Stephan et al. |
| 5,771,037 A | | 6/1998 | Jackson |
| 5,825,349 A | * | 10/1998 | Meier et al. ................. 345/684 |
| 5,889,236 A | | 3/1999 | Gillespie et al. |
| 5,943,052 A | | 8/1999 | Allen et al. |
| 6,014,140 A | * | 1/2000 | Strand ......................... 345/684 |
| 6,034,668 A | | 3/2000 | Jackson |
| 6,043,809 A | | 3/2000 | Holehan |
| 6,075,522 A | | 6/2000 | Milroy |
| 6,075,575 A | * | 6/2000 | Schein et al. ............... 348/734 |
| 6,081,207 A | * | 6/2000 | Batio .......................... 341/20 |
| 6,084,570 A | | 7/2000 | Milroy |
| 6,147,683 A | | 11/2000 | Martinez et al. |
| D451,517 S | * | 12/2001 | Hayes et al. ............... D14/455 |

OTHER PUBLICATIONS

Buxton, W. & Myers, B., A Study in Two-Handed Input, 1986, 10 pages.
Synaptics TouchPad Information (Features, Drives Utilities), 12 pages, (date unknown by prior to Aug. 29, 2001).
Buxton, W. & Rowley P., Issue and Techniques in Touch-Sensitive Tablet Input, 1985, 15 pages.

(Continued)

Primary Examiner—Patrick N. Edouard
Assistant Examiner—Duc Q. Dinh
(74) Attorney, Agent, or Firm—Banner & Witcoff, Ltd.

(57) ABSTRACT

A touch-sensitive device for use as an electronic input device for controlling by scrolling the visible portion of a document or image relative to a display. The device can include various improved configurations such as physically separate opposed input surfaces at opposite longitudinal ends and/or lateral sides. The end regions of a touch sensitive surface may be rounded and/or tapered to provide relative positional feedback to the user. Tactile positional feedback can also include surface texture changes on the scrolling area and/or changes in the surface of the frame in the region immediately adjacent the scrolling area. The touch sensitive areas may be provided within a split alphanumeric section of an ergonomic keyboard to enable scrolling without the user having to remove his or her hands from the alphanumeric section.

32 Claims, 7 Drawing Sheets

OTHER PUBLICATIONS

Hinckley, Ken, Mary Czerwinski, and Mike Sinclair, Interaction and Modeling Techniques for Desktop Two-Handed Input, Proceedings of ACM UIST'98 Symposium on User Interface Sofeware and Technology, pp. 49-58, 1998.

IBM Technical Disclosure Bulletin, Split Keyboard, vol. 29 No. 7, Dec. 1986, 1 page.

MacKenzie, Scott, (How) To Scroll or (How) Not to Scroll, 46 pages (1998).

* cited by examiner

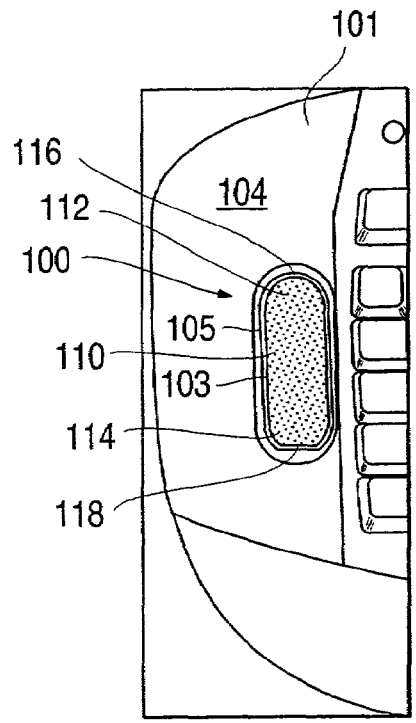
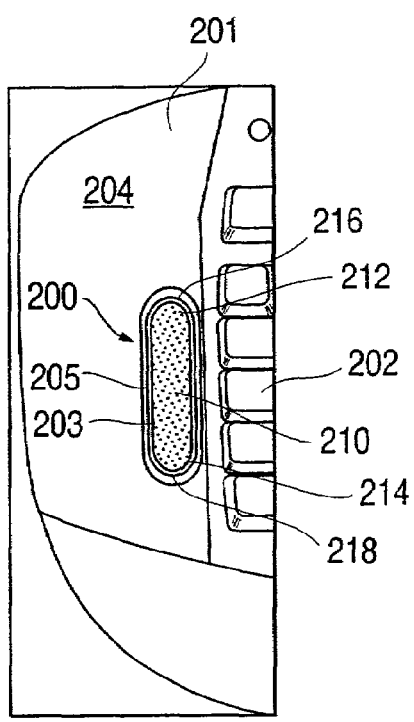
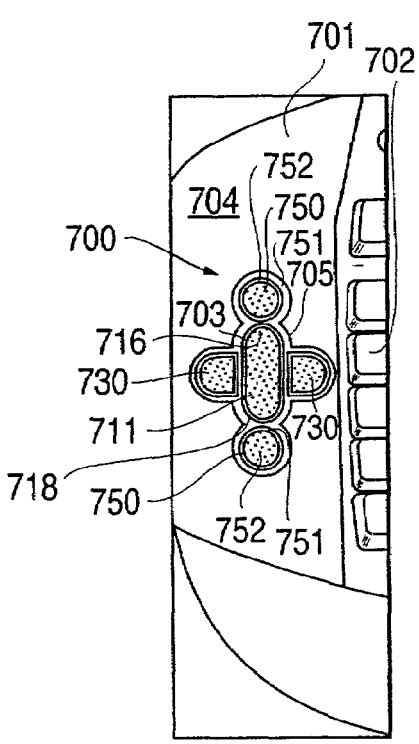
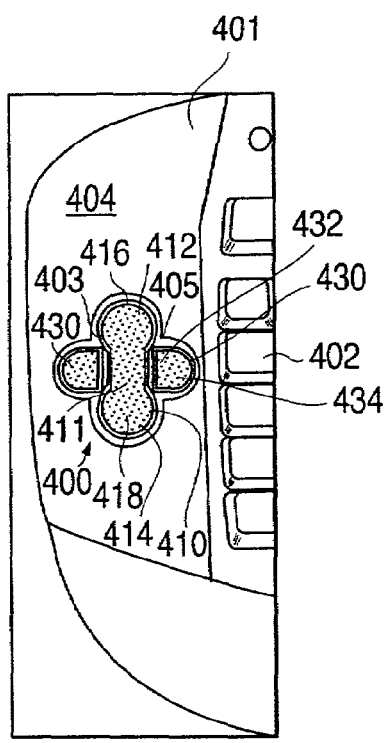

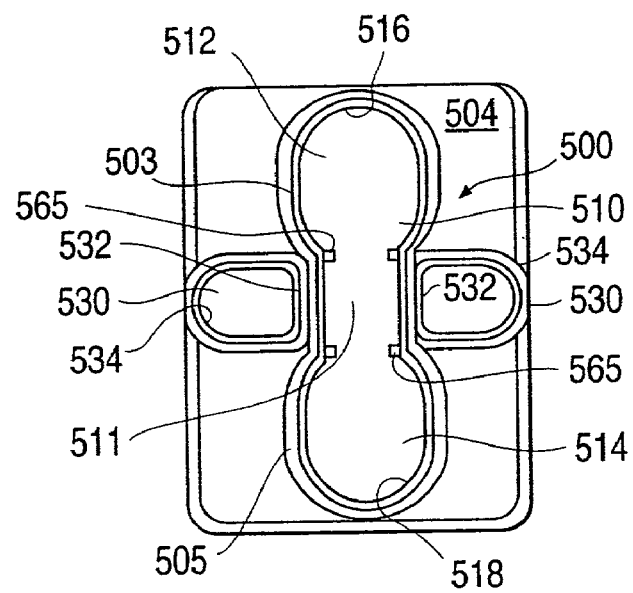

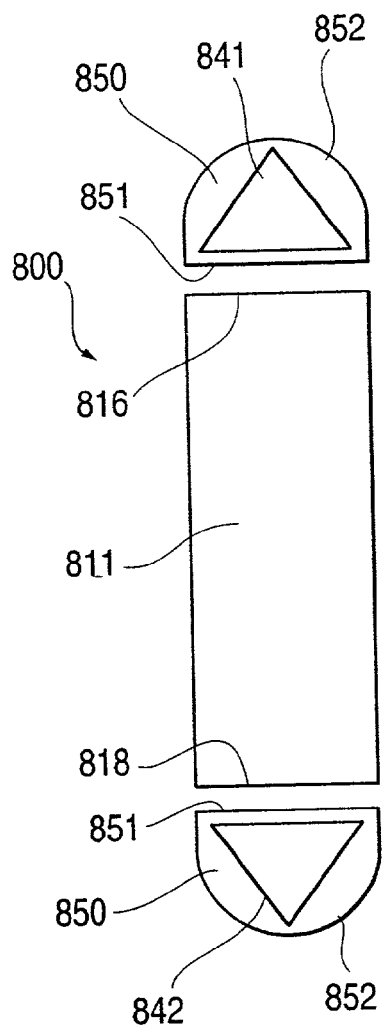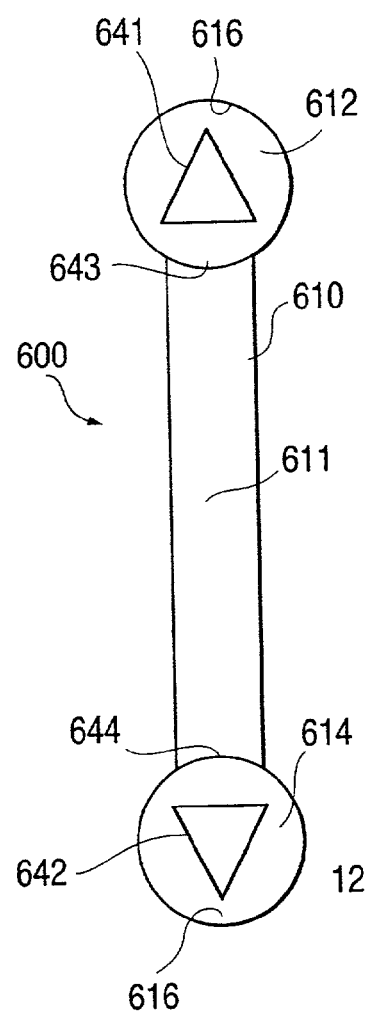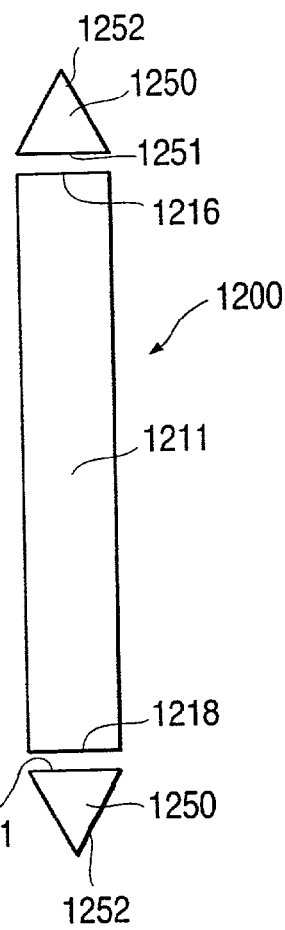

TOUCH-SENSITIVE DEVICE FOR SCROLLING A DOCUMENT ON A DISPLAY

FIELD OF THE INVENTION

The present invention is directed to a touch-sensitive device that can be used as an electronic input device for controlling by scrolling the visible portion of a document relative to a display.

BACKGROUND OF THE INVENTION

Touch pads, which are two-dimensional touch-sensitive surfaces, have been used on computer laptops for controlling the movement of the cursor of the display. Commonly used touch pad configurations include square configurations and non-elongated rectangular configurations. Commercially available touch pads, such as those manufactured by Synaptics Inc., have been provided with software that enables the use of the right or bottom edge of the unitary surface touch pad as a scrolling zone. Such an arrangement is disclosed in U.S. Pat. No. 5,943,052 to Allen et al. However, these touch pad devices, however, are also used for cursor positioning and thus are not dedicated to scrolling. This can cause problems of erroneous activation for the user. These problems include the activation of scrolling when cursor positioning is desired, and the activation of cursor positioning when scrolling is desired.

A commercially available touch pad made by Synaptics Inc. uses software that discriminates different end zones in a scrolling region of a touch pad. When a finger of a user reaches a longitudinal end of the touch pad in the scroll region, the scrolling will continue until the user moves lifts his or her finger from the touch pad or moves his or her finger away from the edge of the touch pad. However, if the user is concentrating on the display, it may be difficult for the user to maximize the scrolling capabilities as it is difficult to know when and whether his or her finger is in or near such a longitudinal end portion. Accordingly, a user may move his finger to reach or leave the end portion prematurely, or may never reach the end portion believing his or her finger is already located in the end portion.

U.S. Pat. No. 5,748,185 to Stephan et al. discloses a touch pad that is physically divided by a cover to provide a square cursor control region, a vertically elongated rectangular scroll control region, and a horizontally elongated pan control region. These regions are illustrated as being a part of a separate input device (in FIG. 2 of U.S. Pat. No. 5,748,185) or in the region in front of the keyboard portion of a laptop computer (in FIG. 13 of U.S. Pat. No. 5,748,185). Additionally, FIG. 10 of U.S. Pat. No. 5,748,185 discloses a unitary surface with elongated scroll and pan bars that overlap in the shape of a "plus" (+). The region where the horizontal pan control bar crosses the vertical scroll control bar overlap is not mapped to control either panning or scrolling. Such an unmapped region would appear to be detrimental in maximizing panning and scrolling control when the user runs his or her finger along the horizontal or vertical bar in the desired direction.

Further, U.S. Pat. No. 6,043,809 to Holehan discloses in FIGS. 1 and 2 the use of a touch sensitive input scroll bars on three edge surfaces of a laptop computer, and on three edge surfaces, between distinct alphanumeric and editing sections, and between distinct editing and numeric sections on a keyboard. However, one potential drawback of these arrangements is that edge regions and the regions between distinct keyboard input sections (such as between distinct alphanumeric and editing sections, and between distinct editing and numeric sections) are sometimes used as resting places for portions of the hands of the user. An occurrence of such an incidental resting on an input scroll bar can cause unintended scrolling for the document on the display.

Additionally, the longitudinal ends of the scroll and panning control regions for all of these arrangements terminate abruptly with a flat edge. This makes it difficult for the user to efficiently recognize when her or she is approaching the end of the region as the user is normally focusing on the document on the display. This also has some drawbacks in the ability to maximize scrolling control, which can be more significant when software provides the end portions with different scrolling capabilities. Accordingly, a solution to this problem is needed.

SUMMARY OF THE INVENTION

Aspects of the invention provide a touch-sensitive device with regions having improved shapes and/or configurations.

In further aspects of the invention, a touch-sensitive device for scrolling a document on a display screen may include a central scrolling area extending along a longitudinal axis, and first and second end scrolling areas positioned along the longitudinal axis on opposed sides of the central scrolling area. The first and second end scrolling areas may be physically separate and spaced from the main scrolling area.

In further aspects of the invention, a touch-sensitive device for scrolling a document on a display screen may include a central scrolling area and first and second end scrolling areas. The central scrolling area may extend along a longitudinal axis and may have a width in a direction perpendicular to the longitudinal axis. The first and second end scrolling areas may be positioned along the longitudinal axis on opposed sides of the central scrolling area, and may have a width that differs from the width of the central scrolling area.

In still further aspects of the invention, a touch-sensitive device for scrolling a document on a display screen may include a scrolling area extending along a longitudinal axis, and opposed first and second ends that may be rounded.

In yet further aspects of the invention, a touch-sensitive device for scrolling a document on a display screen may include a scrolling area extending along a longitudinal axis enabling the scrolling of a document in a first direction, and first and second scroll input surfaces. The first and second scroll input surfaces may be positioned immediately adjacent to the scrolling area, and on opposing sides of and spaced from the scrolling area in a direction perpendicular from the longitudinal axis. The first and second input surfaces may enable the scrolling of a document in a direction perpendicular from the first direction.

Still further aspects of the invention provide a touch-sensitive device for scrolling a document on a display screen that may have a scrolling area extending along a longitudinal axis and opposed first and second ends each having a distal end. The scrolling area may have a width in a direction perpendicular to the longitudinal axis. A tactile feedback arrangement may be located between the distal ends for providing tactile feedback for assisting in the location of the first and second ends.

In yet further aspects of the invention, a keyboard may include an alphanumeric section and an elongated touch-sensitive strip disposed within the alphanumeric section.

These and other features and aspects of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-or-four-digit reference numbers, wherein the first digit of a three-digit reference number (or the first two digits of a four-digit reference number) indicates the drawing number in which the element is first illustrated. The same reference number in different drawings refers to the same or a similar element.

FIG. 1 is a top view of a keyboard having a touch-sensitive device according to a first embodiment of aspects of the present invention;

FIG. 2 is a top view of a keyboard having a touch-sensitive device according to a second embodiment of aspects of the present invention;

FIG. 4 is a top view of a keyboard having a touch-sensitive device according to a fourth embodiment of aspects of the present invention;

FIG. 5 is a top view of a portion of a housing cover for forming a touch-sensitive device according to a fifth embodiment of aspects of the present invention;

FIG. 6 is a top view of a touch-sensitive device pattern according to a sixth embodiment of aspects of the present invention;

FIG. 7 is a top view of a keyboard having a touch-sensitive device according to a seventh embodiment of aspects of the present invention;

FIG. 8 is a top view of a touch-sensitive device pattern according to an eighth embodiment of aspects of the present invention;

FIG. 11 is a top view of a portion of a housing cover for forming a touch-sensitive device according to an eleventh embodiment of aspects of the present invention;

FIG. 12 is a top view of a portion of a housing cover for forming a touch-sensitive device according to a twelfth embodiment of aspects of the present invention;

DETAILED DESCRIPTION OF EXEMPLARY EMBODIMENTS

Figure 9:
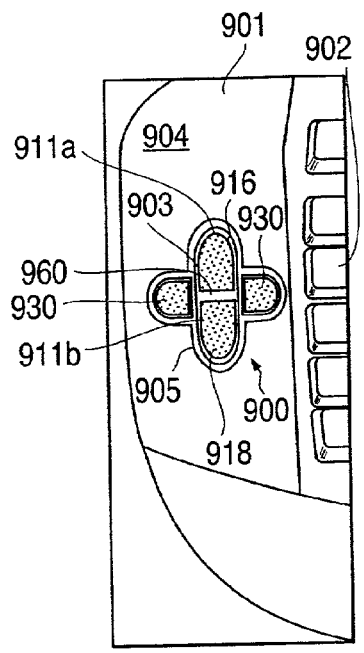
FIG. 9 is a top view of a keyboard having a touch-sensitive device according to a ninth embodiment of aspects of the present invention.

Several exemplary embodiments of touch-sensitive devices for scrolling configurations are shown in FIGS. 1–12. These devices are capable of providing signals for scrolling a document relative to a display device in one or more directions. While the different illustrated embodiments of scrolling devices are shown in isolation and/or as part of a keyboard, aspects of the invention may also include the use of such touch-sensitive devices as part of a stand-alone input device, or in combination with other devices such as a personal digital assistant (PDA), an electronic tablet, a laptop computer, an internet appliance, an electronic book, or on a mouse input device.

The touch-sensitive input device may be coupled to a system (not shown) for electronically processing signals and causing the documents to be scrolled relative to the display. Thus, for example, the scrolling device may be coupled to a computer such as a personal computer (e.g., a desktop or laptop computer) or any other type of computing system.

One or more interfaces and/or driving circuitry/software may be utilized to provide communication between the scrolling device and the computing system. The computing may further include one or more of the following, which may be coupled together such as a keyboard and/or mouse, a processor such as a microprocessor and/or central processing unit, storage such as memory, a hard and/or diskette drive, and/or a display for displaying a document. The device for displaying the document may any suitable device such as, but not limited to, a CRT screen, and LCD screen, a projector, a heads-up display, a virtual-reality, goggle display. Examples of such computing systems are further described in are disclosed in co-pending patent application Ser. No. 09/940,505 filed Aug. 29, 2001, entitled "Manual Controlled Scrolling," which is hereby incorporated by reference as to its entirety, and in co-pending patent application Ser. No. 09/940,463 filed Aug. 29, 2001, entitled "Automatic Scrolling" which is hereby incorporated by reference as to its entirety.

As such, the term "scrolling" as has been generically used herein to include both one-dimensional scrolling as well as two-dimensional movements of the document relative to the display, and includes vertical scrolling, horizontal scrolling, panning, other axial scrolling, and combinations and subcombinations thereof. The document to be scrolled may be any type of document at all, such as a word processing or text document, a spreadsheet, a drawing, a photograph or other image type, and/or an Internet web page. The document may be the displayed output, results, and/or viewable user interface associated with any software and/or hardware-driven application and/or operating system, such as a control screen, window, or file directory. Accordingly, the touch sensitive device can be used for scrolling a document in one or more axes (e.g., X, Y) relative to a display screen.

The touch-sensitive scrolling device may be coupled to a display via any suitable electronic processing device such that the position of a pointer (e.g., a human finger, a stylus, or other appropriate object) on the scrolling device affects the scroll position of a document as shown on an output device such as a display screen. Throughout the specification, there will often be references to the user's finger. Such reference is merely exemplary and will be understood to apply to any type of pointer. The scrolling device may be sensitive to human touch and/or to non-human touch such as from a pen or stylus-type pointer. Alternatively or additionally, the scrolling device may include one or more sensors to detect the pointer position as it hovers immediately over the surface of the scrolling device. The touching of the user's finger to the touch-sensitive surface of the scrolling device may cause the scrolling device to generate at least one signal indicating the location, pressure, speed, acceleration, direction of the finger, and/or which portion of the surface(s) of the scrolling device are being touched by the finger.

In response to the user's finger, one or more signals may be generated by the system indicating information about the contact or proximity of the finger to the scrolling device, and such signals may be interpreted and processed by the system to provide the various scrolling features described herein.

Any number of desirable scrolling techniques may be used for scrolling the documents based upon user inputs. For example, control of scrolling acceleration, scrolling speed, and/or scrolling distance; automatic scrolling based on finger position, contact type, and/or pressure; scrolling position modification, rounding, and/or fine-tuning techniques; and/or gesture and/or movement detection may be used.

Further, the same touch-sensitive surface may be used to support any combination or subcombination of the various different scrolling techniques or modes. Thus, more than one type of scrolling mode and/or feature may be used with the same scrolling device. Further, although certain exemplary gestures (e.g., tap-and-hold, or double-tap) may be manners of implementing or invoking certain features and scrolling modes, any desired gesture may be used to implement or invoke any feature and/or scrolling mode in any combination or subcombination. In addition, if desired, the scrolling device may be programmed to enable jumping to certain location in the document. Examples of such various scrolling modes and techniques are disclosed in co-pending patent application Ser. No. 09/940,505 filed Aug. 29, 2001, entitled "Manual Controlled Scrolling," which is hereby incorporated by reference as to its entirety, and in co-pending patent application Ser. No. 09/940,463, filed Aug. 29, 2001, entitled "Automatic Scrolling," which is hereby incorporated by reference as to its entirety.

In the arrangements of FIGS. 1 and 2, touch-sensitive input devices 100, 200 are shown for exemplary purposes as part of keyboards 101, 201 and for exemplary purposes in regions located laterally to the left of the alphanumeric sections 102, 202. The touch-sensitive input devices 100, 200 are preferably accessible through and/or located within an opening 103, 203, window, or hole in the top of the housing 104, 204 of the keyboard 101, 201. The opening 103, 203 is preferably of a shape complimentary or similar to the shape of the active scrolling surface. If desired, the housing 104, 204 may include a contoured boundary transition region 105, 205 that extends around some or all of the periphery of the touch-sensitive input devices 100, 200 to facilitate location of the touch-sensitive input devices 100, 200 by tactile feedback to the user.

The touch-sensitive input devices 100, 200 preferably include a scrolling surface 110, 210, and opposing first (e.g., top) and second (e.g., bottom) longitudinal end areas 112, 212 and 114, 214. In FIGS. 1 and 2, the longitudinal end areas 112, 212 and 114, 214 are curved or tapered at their distal ends 116, 118, 216, 218. These curved end profiles 116, 118, 216, 218 are beneficial because they tend to more closely match the profile of a finger of a user, which in turn, allows the user to better locate the ends without visual confirmation and provides increased comfort when the user is invoking that portion of the touch-sensitive surface 100, 200. Additionally, the curved portions 116, 118, 216, 218 provide the end areas 112, 212 and 114, 214 with an inherent taper that provides tactile feedback to the user that his or her finger is approaching the end of the touch-sensitive surface 110, 210 prior to reaching the end. As can seen from the figures, the exemplary scrolling surface 100, 200 is an uninterrupted, continuous exposed surface between its longitudinal ends.

In one exemplary mounting arrangement, the scrolling surface 100, 200 is elongated front-to-back, and movement of the user's finger along the scrolling surface 100, 200 is capable of causing the document to scroll up and down based on the direction of finger movement.

In the embodiment of FIG. 1, the length of the scrolling surface 110, 210 is understood to be the distance from end-to-end 116 to 118 or 216 to 218 along its respective longitudinal axis. In an exemplary arrangement, the length (or average length) of the scrolling surface 110 is preferably about 2.9 times its width (or average width), while the same ratio for the scrolling surface 210 is about 4.6. The ratio may be any desired amount, and ratios of 2.0 or greater, 2.5 or greater, 3.0 or greater, 3.5 or greater, 4.0 or greater, and 5.0 or greater, are advantageous as well. In some examples, the length (or average length) of the touch-sensitive surface is between 40 mm and 80 mm such as 65 mm, while the width (or average width) is within the range between 10 mm and 30 mm such as 14 mm (as shown in FIG. 1) and 22 mm. (as shown in FIG. 2). However, it is recognized that alternative dimensions could be used.

Figure 3:
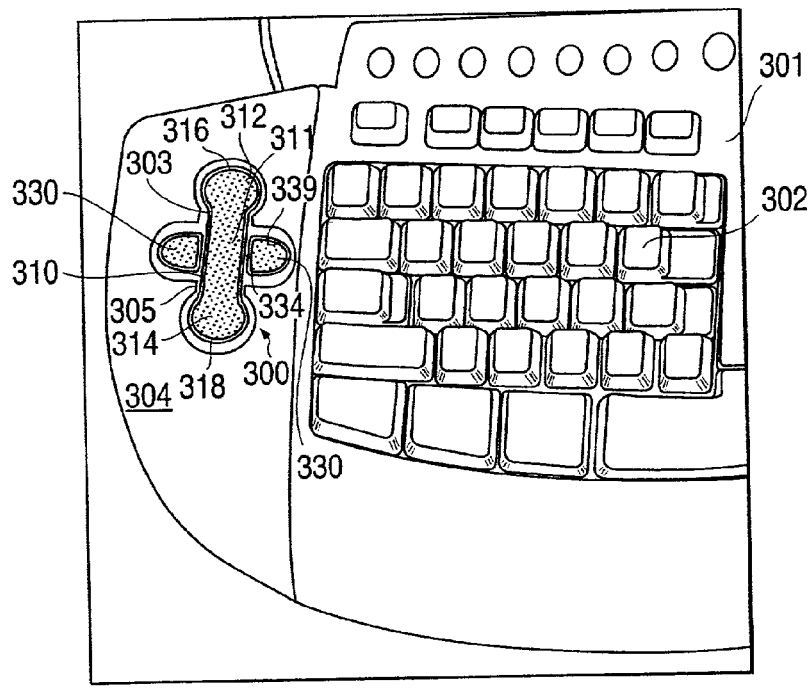
FIG. 3 is a top view of a keyboard having a touch-sensitive device according to a third embodiment of aspects of the present invention.

FIGS. 3–6 illustrate scrolling devices 300, 400, 500, 600 having alternative scrolling surface configurations. FIGS. 3 and 4 show the surface configurations 310, 410 as part of a portion of a keyboard 301, 401. FIG. 5 shows the surface configuration 510 with a generic cover portion that might, for example, form a portion of the top cover for a housing. FIG. 6 is a schematic top view of a surface configuration 610 that would preferably be used with part of a housing.

In these embodiments, the respective longitudinal end areas, 312, 412, 512, 612 and 314, 414, 514, and 614 have enlarged widths relative to the widths of the respective central portions 311, 411, 511, 611 of scrolling regions 310, 410, 510, and 610. In other words, the ends regions 312, 412, 512, 612 and 314, 414, 514, and 614 maybe be wider in a direction perpendicular to the longitudinal axis (i.e., from longitudinal end to longitudinal end) than in the central portions 311, 411, 511, 611. The widest points of the end portions 312, 412, 512, 612 and 314, 414, 514, and 614 are preferably, but not necessarily, between 5% and 50% wider than the respective central portions. These configurations result in a thermometer-shaped contiguous surface. Similar to those described with FIGS. 1 and 2, the longitudinal end areas 312, 412, 512, 612, and 314, 414, 514, 614 are preferably curved or tapered at their distal ends 316, 318, 416, 418, 516, 518, 616, 618.

The end portions 312, 412, 512, 612 and 314, 414, 514, 614 may be formed in a generally circular configuration (FIGS. 3, 4, and 6) or may be formed in more of an elliptical or ovular configuration (FIG. 5). The enlarged end portions 312, 412, 512, 612 and 314, 414, 514, 614 in combination with their respective central portions may form a scrolling surface 310, 410, 510, 610 that includes an elongated, uninterrupted, continuous exposed touch-sensitive surface between its longitudinal ends.

FIGS. 3–6 also differ in the relative proportions of the scrolling surface, mainly in the proportion of the central regions 311, 411, 511, 611, and their relationships to the respective end portions 312, 412, 512, 612 and 314, 414, 514, 614. These scrolling surfaces may be configured in any desirable size and/or proportion such as the size, size range, dimension, and/or dimension ranges as shown in FIGS. 1 and/or 2.

FIGS. 3–5 also provide optional side scrolling areas 330, 430, 530. In an exemplary arrangement, side scrolling areas 330, 430, 530 are (1) positioned immediately adjacent to their respective main scrolling areas 310, 410, 510; (2) physically separate from their respective main scrolling areas 310, 410, 510; and/or (3) located on opposing sides of and spaced from their main scrolling areas 310, 410, 510 in a direction perpendicular from their longitudinal axis.

The side input surfaces 330, 430, 530 may enable the scrolling of a document in a direction perpendicular from the scrolling direction caused by moving the user's finger along the longitudinal axis. Thus, if in one mounting arrangement, the scrolling surface 300, 400, 500 is elongated front-to-back (e.g., elongated from 318 to 316) and movement of the user's finger along the scrolling surface (e.g., between 318 and 316) causes the document to scroll up and down based on the direction of finger movement, then the side scrolling surfaces 330, 430, 530 would enable the scrolling of the document left and right. If desired, scrolling in these perpendicular directions (in this example, left and right) may be responsive to touching, or tapping, or tapping-and-holding, the surfaces 330, 430, 530, and there might be no requirement to move the user's finger along these surfaces. In the illustrated embodiments, the side-scrolling surfaces 330, 430, 530 have a generally straight edge 332, 432, 532 proximal to the respective central scrolling regions 311, 411, 511 and a rounded or tapered edge 334, 434, 534 distal from the respective central scrolling regions 311, 411, 511. If desired, as shown in FIGS. 3 and 4, the transition region 305, 405 of the housing 304, 404 may partially or fully extend around the periphery of the side scrolling surfaces 330, 430.

Any or all of the scrolling devices disclosed herein may include one or more textual, graphical, and/or other indicia printed or otherwise applied, engraved, or etched thereon. These indicia can help provide visual feedback of where the central and end regions meet, or other positioning-related feedback. Further, if the indicium is slightly raised on the scrolling surface, tactile feedback may also be provided. For example, as shown in FIG. 6, such indicia may include directional arrows 641, 642 and/or separation lines 643, 644 (straight or curved) between the central 611 and end regions 612, 614.

FIGS. 7, 8, and 12 illustrate alternative embodiments of scrolling devices 700, 800, 1200. FIG. 7 shows the scrolling device 700 with a portion of a keyboard 701. FIGS. 8 and 12 schematically show the surfaces of their respective scrolling devices 800 and 1200 without a cover or housing. In these embodiments, additional first (e.g., top) and second (e.g., bottom) end scrolling surfaces 750, 850, 1200 are provided that are (1) positioned along the longitudinal axis on opposed sides of a main or central scrolling area 711, 811, 1211; and/or (2) physically separate and/or spaced from a main scrolling area 711, 811, 1211.

The end input scrolling surfaces 750, 850, 1250 enable the scrolling of a document in the same direction as the scrolling direction caused by moving the user's finger along the longitudinal axis of the main scrolling area 711, 811, 1211 (e.g., along the longitudinal axis defined between 716 and 718). Thus, for example, if intended for vertical scrolling of the document, the first or upper end region would be an up scrolling region, and the second end region would be a down scrolling region. If desired, end input scrolling surfaces 750, 850, 1250 can be configured to provide additional scrolling options such as constant speed scrolling or scrolling at a slower or faster speed. Further, scrolling with the end input scrolling surfaces 750, 850, 1250 can be accomplished by, e.g., touching, tapping, or tapping-and-holding the surfaces 750, 850, 1250. In such an embodiment, there might be no requirement to move the user's finger along these surfaces. Thus, in one mounting arrangement, where the scrolling devices 700, 800, 1200, and their respective main scrolling areas 711, 811, 1211 are elongated front-to-back, and movement of the user's finger along the respective scrolling surfaces 711, 811, 1211 is capable of causing the document to scroll up and down based on the direction of finger movement, the end scrolling surfaces 750, 850, 1250 may also enable the scrolling of the document up and down.

The distal longitudinal ends 716, 718, 816, 818, 1216, 1218 of the central scrolling area 711, 811, 1211 may be curved or otherwise tapered as shown in FIG. 7, or may be flat as shown in FIGS. 8 and 12. The edge 751, 851, 1251 of the end scrolling surfaces 750, 850, 1250 that is proximal to the central scrolling area 711, 811, 1211 may be straight as shown in FIGS. 8 and 12 or otherwise curved or tapered as shown in FIG. 7. The edge 752, 852, 1252 of the end scrolling surfaces 750, 850, 1250 that is distal from the central scrolling area 711, 811, 1211 is preferably curved as shown in FIGS. 7 and 8 or otherwise tapered such as by diverging triangular edges as shown in FIG. 12. These configurations may assist the user in properly locating the user's finger by providing tactile and/or visual feedback.

FIG. 7 further discloses the combination of the separate end scrolling regions 750 with separate side scrolling regions 730. This configuration may be used to provide additional scrolling options and capabilities. FIG. 8 also discloses the use of indicia 841, 842 to provide helpful feedback to the user.

Figure 10:
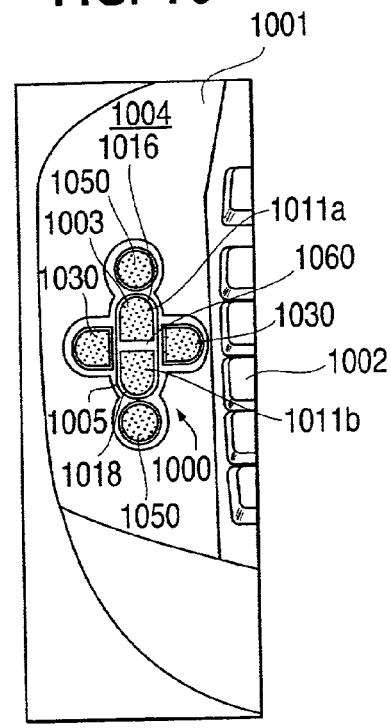
FIG. 10 is a top view of a keyboard having a touch-sensitive device according to a tenth embodiment of aspects of the present invention.

FIGS. 9–11 illustrate alternative embodiments of scrolling devices 900, 1000, 1100. FIGS. 9 and 10 show the surfaces in conjunction with a portion of a keyboard, and FIG. 11 shows the surfaces with a generic cover portion that might, for example, form a portion of the top cover for a housing of a device such as a keyboard, mouse, or laptop housing. In these embodiments, the elongated central scrolling surface is actually configured as two sectioned surfaces 911a, 911b, 1011a, 1011b, and 111a, 111b that are preferably physically separated or otherwise divided along the longitudinal axis. In one exemplary arrangement, the sections are separated across the middle by a physical barrier 960, 1060, 1160, a bezel, a portion of the housing that may be raised such as a ridge (or a protrusion or series of protrusions or nibs) or lowered such as a groove, or that may be of the same height as the surrounding housing, and/or other physical dividing structure. The distal ends 916, 918, 1016, 1018, 116, 1118 of these surfaces 911a, 911b, 1011a, 1011b, and 1111a, 111b are preferably, but not necessarily, rounded or otherwise tapered as previously described. These embodiments may include side scrolling surfaces 930, 1030, 1130 and/or end scrolling surfaces 1050 as previously described and shown in FIGS. 9–11.

The barrier 960, 1060, 1160 preferably provides a tactile cue that enables the user to feel where the center of the scrolling surface is and where a transition occurs without the need to be visually distracted from the work being performed on the display screen. Alternatively or additionally, the barrier 960, 1060, 1160 may enable the user to utilize the top and bottom sections (e.g., sections 911*a*, 911*b*) of the scrolling surface for different scrolling functions or techniques.

Another example of a tactile cue that may be on any embodiment and that may enable the user to physically feel where his or her finger is on the scrolling area relative to the scrolling area is illustrated in FIG. 11. These tactile cues may include one or more bezels 1165, or variations on the bezel such as small nibs (protrusions) or grooves (recesses) positioned along the recessed area immediately adjacent to and/or extending over the scrolling region. These tactile cues may, for example, be at 0%, 25%, 50%, 75%, and 100% along the main scrolling region, and/or at the transition regions between the main scrolling area and the opposing end scrolling areas. These cues provide the user with the ability to feel their relative position along the scrolling surface. This can facilitate scrolling and jumping control.

FIGS. 1–12 illustrate various combinations of features and attributes of the scrolling devices. However, all permutations of the different features and attributes described are usable together. Further, the scrolling devices may be used on any type of device, such as in conjunction with another input device or as a stand-alone input device regardless of whether it is schematically depicted in FIGS. 6, 8, and 12, shown with a generic cover portion as in FIGS. 5 and 11, or shown as part of a keyboard as in FIGS. 1–4, 7, 9, and 10. The scrolling surfaces may be configured as separate sensing members or may be part of a single larger sensing pad with access to certain portions restricted by portions of the housing (where the housing may act like a mask over one or more portions of the scrolling surface) and/or other physical barriers.

The touch sensitive scrolling devices are preferably sized to permit comfortable scrolling capability by the hand size of an average keyboard user. It is noted that the proportions of the scrolling features of the scrolling devices as shown in the drawings as filed are to scale, and the Applicant reserves the right to explicitly incorporate specific textual written descriptions of various proportions and shapes already depicted in these figures.

Thus, in some embodiments, the up and down scrolling areas and/or the side scrolling areas may be provided and may be physically separate from the main scrolling area. If the end scrolling regions are a contiguous part of the scrolling surface, various transition regions or locations may have visible or tactile features (such as lines) that distinguish them from the rest of the pad.

In some embodiments, physically distinct regions, or contiguous "virtual" regions at the extreme ends of the scrolling surface may be used to trigger multiple functions that might not be available on the main or central area of the scrolling strip. These regions may be configured to respond to gestures such as tapping, tapping-and-holding, double-tapping, or double-tapping and then holding, and may control functionality such as jumping to the Home or End portions of the document (by, for example, double-tapping), auto-scrolling the document (by, for example, tapping-and-holding), and page up/page down navigation document (by, for example, single-tapping).

Figure 13:
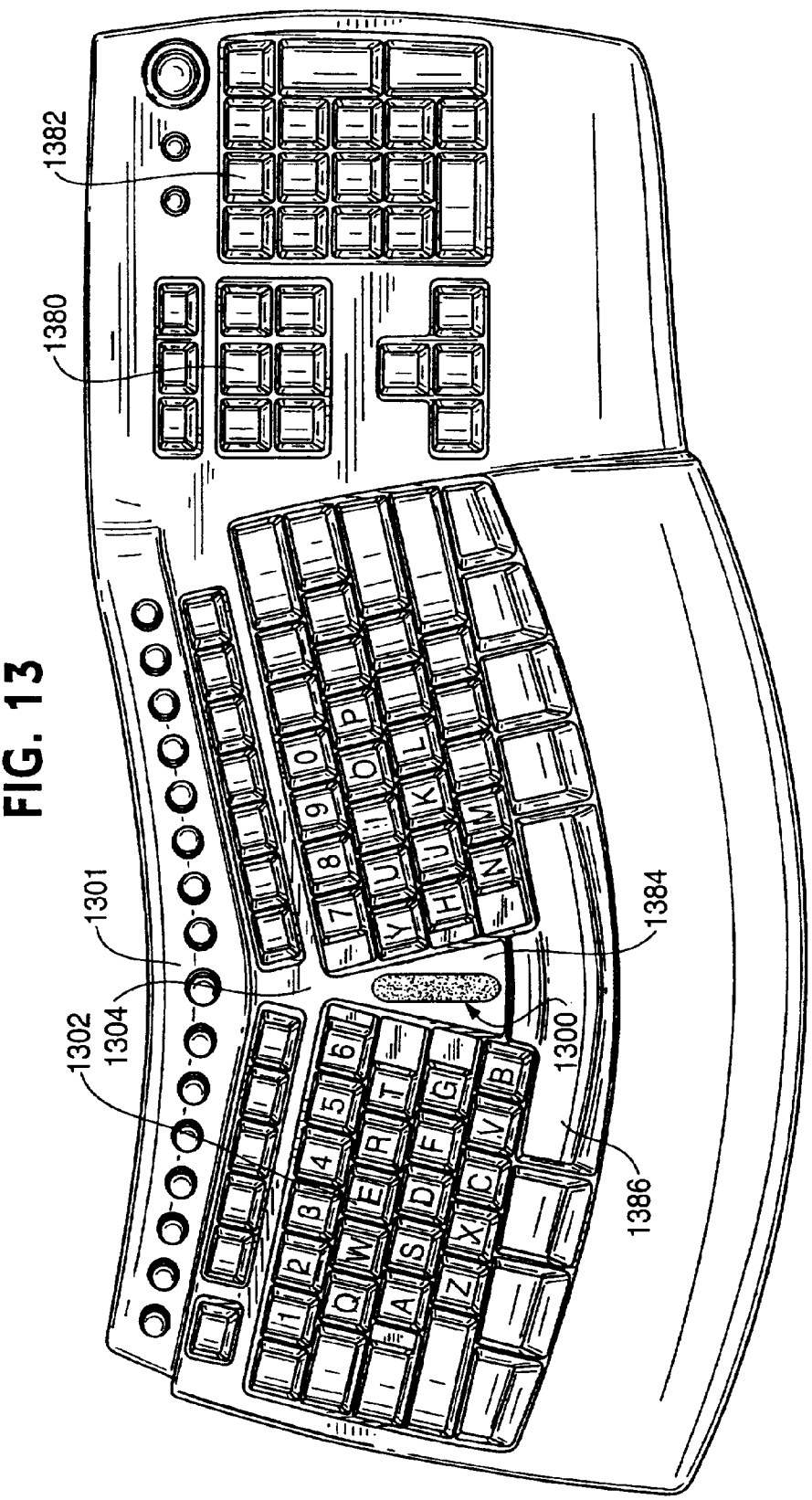
FIG. 13 is a top plan view of an ergonomic split keyboard incorporating a touch-sensitive strip within a split alphanumeric section according to aspects of the present invention.

Basic touch pad and scrolling strip functionality is known in the art. Depending upon the preferred ultimate uses, any desired scroll speed, scroll positioning control, finger moving and/or not moving detection technique or program may be used. Existing touch pad technologies and/or multiple touch-sensitive regions with quadrature motion detection or multiple keyboard traces may be used. Further, to reduce costs, it may be feasible to configure various embodiments to be used with and/or controlled by existing keyboard micro-controllers and/or micro-controllers of other input devices. If desired, a keyboard modifier key and/or a key on another input device such as a mouse, may be used in combination with any of the gestures recognized on the touch-sensitive scrolling strip to support and invoke various functionality. For example, holding down the Control key (Ctrl) while sliding one's finger along the strip can control the current zoom factor of the document or change the scroll orientation (e.g., from vertical scrolling to panning or horizontal scrolling, or vice-versa)

Where configured as part of a keyboard, embodiments of the scrolling device may be located in any desirable location on the keyboard such as on the left or right side or bottom edge. In a specific application, the scrolling device may be a part of an ergonomic or split keyboard. FIG. 13 discloses an exemplary embodiment of such a keyboard 1301 incorporating an elongated touch-sensitive device 1300. The keyboard 1301 may include an alphanumeric section 1302 and may further include an editing section 1380 and/or a numeric section 1382 being each laterally disposed from the alphanumeric section 1302. In this arrangement, the alphanumeric section 1302, commonly referred to as the QWERTY section, is split to define a region 1384 between the split portions. Such split arrangements are known in the art to provide ergonomic benefits.

In one exemplary embodiment, the alphanumeric section 1302 is split and provides the B key, the G key, the T key and the 6 key in the group of keys to the left of the region, and the N key, the H key, the Y key and the 7 key in the group of keys to the right of the region. The space bar 1386 may extend between and/or be included in both groups. The space bar 1386 may also extend directly in front of the region 1384.

A touch-sensitive scrolling device 1300, such as but not limited to any of the strips as previously described, may be disposed within the region 1384 and/or within the alphanumeric section. This arrangement places the scrolling device 1300 in engagement range for the index fingers of the left and right hands of the user when the hands are properly positioned during normal alphanumeric typing. Accordingly, this arrangement enables easy activation of the touch-sensitive surface of the scrolling device 1300 during normal alphanumeric typing activities without the user having to reposition his or her hand(s).

Figure 14:
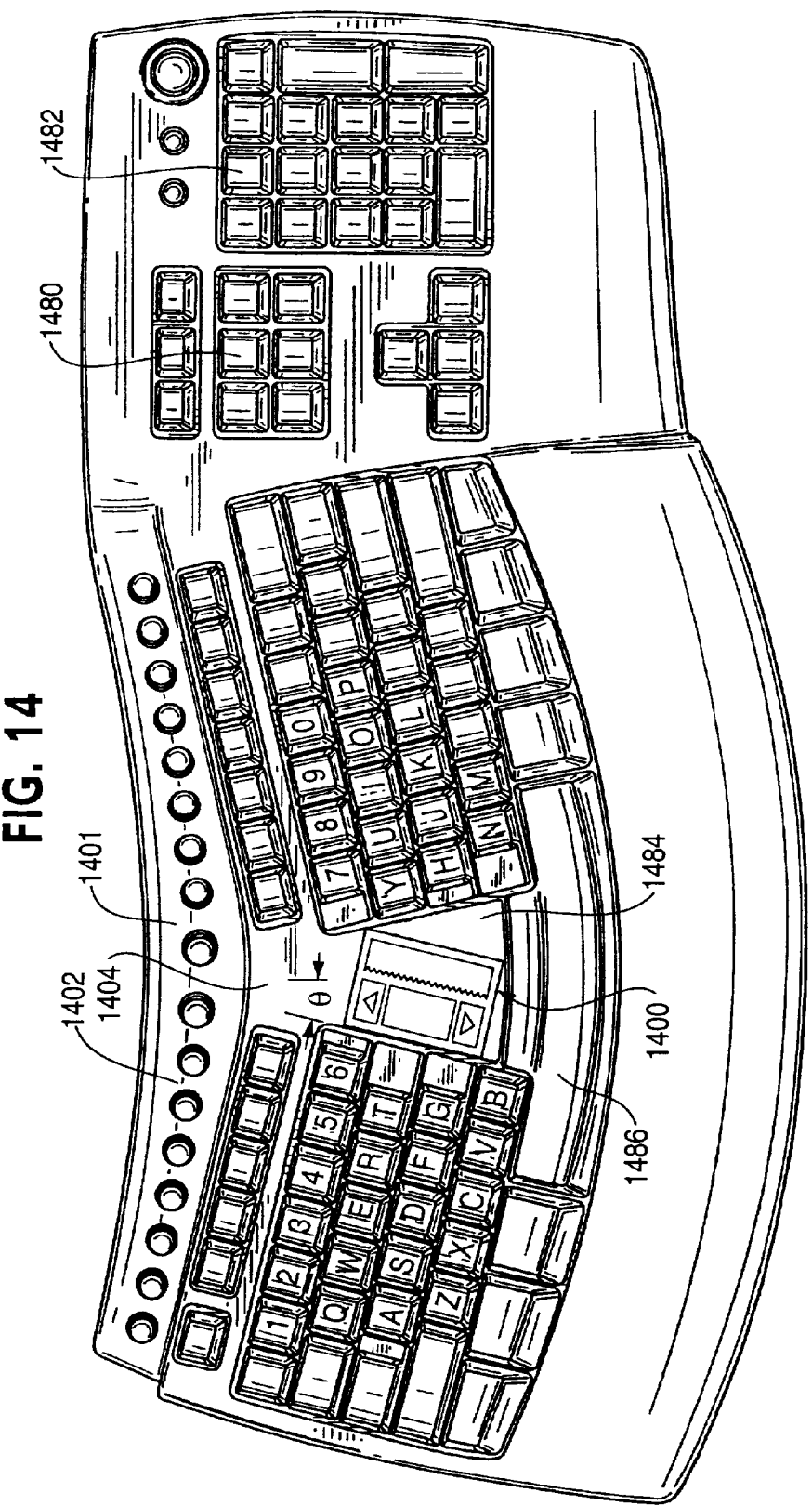
FIG. 14 is a top plan view of an ergonomic split keyboard incorporating an alternative embodiment of a touch-sensitive device within a split alphanumeric section according to aspects of the present invention.
Figure 15:
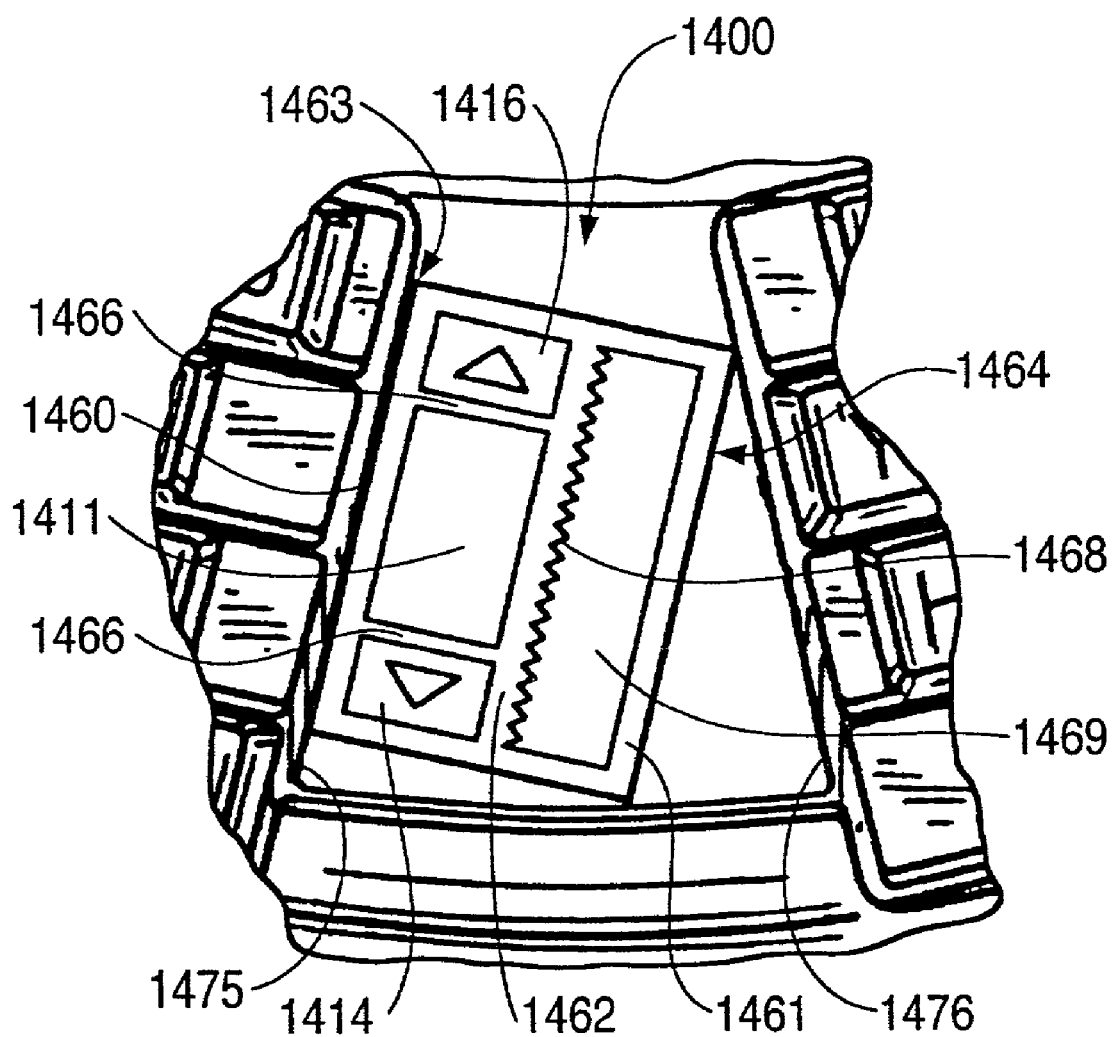
FIG. 15 is an enlarged view of the touch-sensitive device of FIG. 14.

Additionally, while the touch-sensitive scrolling device 1300 is illustrated in FIG. 13 as being oriented so that its longitudinal axis extends in a straight front-to-back direction, it may be angularly displaced if desired as shown in FIG. 14. Similar to the embodiment of FIG. 13, the embodiment of FIG. 14 includes a split alphanumeric section 1402 having a space bar 1486 and a region 1484 between the split sections, an editing section 1480, and a numeric section 1482. The touch-sensitive scrolling device 1400 may include two elongated strips, and in the illustrated embodiment, the longitudinal axis of each strip and/or both side edges 1460 and 1461 (FIG. 15) of the device is angled to be parallel to an inner side 1475 or 1476 of one of the two split portions in the alphanumeric section 1404 (FIG. 15). Thus, for example, as shown in FIG. 14, the scrolling strip may be displaced by angle Θ relative to the front-back direction of the keyboard to be generally parallel to the inside edge angle of one of the two split keyboard portions. This enables enhanced control by a finger of a single hand when the user has his hand disposed to type on the split keyboard. The angle Θ is preferably, but need not be within the range of 5 to 20 degrees.

Additional features of scrolling device 1400 are shown in FIG. 15. Scrolling device 1400 preferably includes two parallel touch sensitive input sections 1463 and 1464 that are physically separated by a raised divider 1462. One section, for example the left section 1463, may be in accordance with any of the aforementioned touch sensitive devices. In this arrangement, the section 1463 includes a central touch sensitive area 1411 and separated distal end sections 1414 and 1416. Physical dividers 1466 may be used to provide tactile feedback to the user regarding his finger position along the strip. Additionally, graphical elements, such as arrows or other indicia, may be used, and any or any combination of the previously disclosed characteristics, such as enlarged or tapered ends, may also be provided.

The other section, for example the right section 1464, may be as illustrated or may be in accordance with any of the aforementioned touch sensitive devices. In the illustrated arrangement, the right section includes an elongated scrolling surface 1469. The divider 1462 separating the scrolling surfaces 1411 and 1469 includes tactile feedback to the user about his finger location. The divider 1462 includes at least one edge differing in texture from the other regions around the scrolling surfaces. Thus, as shown, divider 1462 may include a sawtooth edge 1468 to provide tactile feedback as to which of the two scrolling strips are being contacted. However, if desired, any of the aforementioned tactile feedback arrangements may be used.

The two separate scrolling devices 1463 and 1464 are preferably used to control scrolling differently. In a first arrangement, absolute motion occurs in the touch sensitive region 1469 on the "sawtooth" side. Alternatively, instead of absolute motion, the touch sensitive region 1469 on the "sawtooth" side can provide an increased gain factor, for example, five times the movement speed of the other touch sensitive device 1411. The tactile feedback of the central divider, especially the "sawtooth" configuration, provides tactile feedback conveying to the user which side of the divider 1462 he or she is on. This in turn, provides feedback as to which of the differing functions that would be activated upon movement of the finger touching the strip. Thus, in this touch sensitive arrangement shown in FIG. 15, the left touch sensitive device 1463 has a central section 1411 and specialized end regions 1414 and 1416, and the right touch sensitive device 1464 can provide absolute or increase speed scrolling. The dividers 1462 and 1466, including and tactile feedback structure thereon helps the user "feel" his finger position on the device. Instead of the sawtooth shaped contour, alternative contours may be used. Preferably, of course, the contour differs from the edges of the surrounding edges of other touch sensitive surface.

While the sawtooth contoured edge 1468 assists the user in discriminating by touch which of the two scrolling regions is being engaged or is about to be engaged, the sawtooth edge 1468 can also assist the user in locating his relative position between the top and bottom of the adjacent scroll strip. Accordingly, it may be provided as a side edge for any or all of the scrolling strip configurations of FIGS. 1–12. Additionally, while the sawtooth edge 1468 extends between the two ends of the scrolling region 1469, the sawtooth profile may be in selected regions along the length of the scrolling region.

While exemplary systems and methods embodying the present invention are shown by way of example, it will be understood, of course, that the invention is not limited to these embodiments. Modifications may be made by those skilled in the art, particularly in light of the foregoing teachings. For example, each of the features of the aforementioned embodiments and examples may be utilized in combination with other embodiments.

What is claimed is:

1. A touch-sensitive device for scrolling a document on a display screen, said device comprising:
   a central scrolling area extending along a longitudinal axis; and
   first and second end scrolling areas positioned along the longitudinal axis on opposed sides of the central scrolling area, said first and second end scrolling areas being physically separate and spaced from the central scrolling area; and
   first and second scroll input surfaces positioned immediately adjacent to said central scrolling area, and on opposing sides of and spaced from said central scrolling area in a direction perpendicular from said longitudinal axis, said first and second input surfaces enabling the scrolling of a document in opposite directions along a first axis.

2. The touch-sensitive device of claim 1, wherein said device is part of a keyboard including an alphanumeric section, said scrolling area being disposed within said alphanumeric section.

3. The touch-sensitive device of claim 1, further comprising a housing with first, second and third opening that frames the central, first end, and second end scrolling areas.

4. The touch-sensitive device of claim 3, said housing further having members extending across scrolling regions to physically divide said central and first end scrolling areas, and said central and second end scrolling areas.

5. The device of claim 1, further comprising a housing with first, second, third, fourth, and fifth openings that frames said central scrolling area, said first and second input surfaces, and said first end and second end scrolling areas, respectively.

6. The device of claim 5, wherein said central scrolling area has a length measured along the longitudinal axis and an average width perpendicular from the longitudinal axis, wherein said length is greater than two times the width.

7. The device of claim 5, wherein said central scrolling area has a length measured along the longitudinal axis and an average width perpendicular from the longitudinal axis, wherein said length is greater than three times the width.

8. The device of claim 5, wherein said first and second end scrolling areas enable the scrolling of a document in opposite directions along a second axis perpendicular to the first axis.

9. The touch-sensitive device of claim 1, wherein said first end and second end scrolling areas are generally circular in shape.

10. The touch-sensitive device of claim 1, wherein said first end and second end scrolling areas are generally hemispherical in shape.

11. The touch-sensitive device of claim 1, wherein said first end and second end scrolling areas are generally triangular in shape.

12. A touch-sensitive device for scrolling a document on a display screen, said device comprising: a central scrolling area extending along a longitudinal axis and having a width in a direction perpendicular to the longitudinal axis, first and second end scrolling areas positioned along the longitudinal axis on opposed sides of the central scrolling area, said first and second end scrolling areas having a width that differs from the width of the central scrolling area, and first and second scroll input surfaces positioned adjacent to said central scrolling area, and on opposing sides of and spaced from said central scrolling area in a direction perpendicular from said longitudinal axis, said first and second input surfaces enabling the scrolling of the image in opposite directions along a first axis, and wherein said device is part of a keyboard including an alphanumeric section.

13. The touch-sensitive device of claim 12, said first and second end scrolling areas having a width that is greater than the width of the central scrolling area.

14. The touch-sensitive device of claim 12, further comprising a housing with an opening that frames the central and first and second end scrolling areas.

15. The touch-sensitive device of claim 12, said first and second end scrolling areas have a width that is narrower than the width of the central scrolling area.

16. The touch-sensitive device of claim 15, wherein the first and second ends each have distal ends, said first and second end tapering in width as they approach their distal ends.

17. The touch-sensitive device of claim 16, further comprising a housing with an opening that frames the scrolling area.

18. The device of claim 12, further comprising tactile feedback means located between the first and second scrolling areas for providing tactile feedback for assisting in the location of the first and second scrolling areas.

19. The device of claim 18, wherein the tactile feedback means is located on an outer surface on the central scrolling area.

20. The device of claim 19, wherein the tactile feedback means includes surface texture on the outer surface of the central scrolling area.

21. The device of claim 18, further comprising a housing with an opening that frames at least the central scrolling area, and wherein the tactile feedback means includes changes in the surface of the frame in the region immediately adjacent the opening.

22. The device of claim 18, wherein the tactile feedback means includes at least one member coupled to the housing and extending into a boundary of the central scrolling area.

23. A system for scrolling a document on a display screen, said system comprising:
a first touch-sensitive device having an elongated touch sensitive input surface;
a second touch-sensitive device having an elongated touch sensitive input surface, said second-touch sensitive device being spaced from and adjacent to said first touch-sensitive device; and
a physical divider disposed between first and second touch-sensitive devices, said divider having a contoured edge immediately adjacent the elongated touch sensitive input surface of at least one of said first and second touch-sensitive devices;
wherein said contoured edge is sawtoothed shaped assisting the user in locating a position between a top and a bottom of at least one of the first and second touch-sensitive devices.

24. A keyboard having the system of claim 23, said keyboard having an alphanumeric section having a G key and a H key; and
said first touch-sensitive device being disposed between said G key and said H key.

25. The keyboard of claim 24, further comprising an editing section and a numeric section, said editing section and said numeric section being laterally disposed from said alphanumeric section.

26. A keyboard having the system of claim 23, said keyboard having an alphanumeric section having a T key and a Y key; and
said first touch-sensitive device being disposed between said T key and said Y key.

27. A keyboard having the system of claim 23, said keyboard having
an alphanumeric section including a space bar; and
said first touch-sensitive device being disposed immediately behind said space bar.

28. A keyboard having the system of claim 23, said keyboard having
an alphanumeric section having a G key, a H key, a T key, a Y key, and a space bar; and
said first touch-sensitive device being (a) disposed between said G key and said H key, (b) disposed between said T key and said Y key, and (c) disposed immediately behind said space bar.

29. A keyboard having the system of claim 23, said keyboard having
an alphanumeric section;
wherein the keyboard has a front-to-back direction extending from a front of the keyboard to a back of the keyboard, and a side-to-side direction extending from a left side of the keyboard to a right side of the keyboard, the front-to-back direction being perpendicular to the side-to-side direction, wherein said first touch-sensitive device extends along a longitudinal axis that is angularly displaced from the front-to-back direction.

30. The keyboard of claim 29, wherein said longitudinal axis of said elongated touch sensitive strip is angularly displaced from the front-to-back direction by an angle in the range between 5 and 20 degrees.

31. A keyboard having the system of claim 23, said keyboard having
an alphanumeric section; and
wherein the alphanumeric section is divided into first and second portions, said first and second portions each being generally angularly disposed relative the keyboard, said first touch-sensitive device extends along a longitudinal axis that is angularly disposed relative to the keyboard by an amount that is approximately the same and the angular disposition of the first portion.

32. The system of claim 23, wherein said divider has a second edge opposite from said contoured edge, said second edge having a contour that differs from said sawtoothed shape.

* * * * *

UNITED STATES PATENT AND TRADEMARK OFFICE
CERTIFICATE OF CORRECTION

PATENT NO. : 6,972,749 B2
APPLICATION NO. : 09/940900
DATED : December 6, 2005
INVENTOR(S) : Kenneth P. Hinckley et al.

It is certified that error appears in the above-identified patent and that said Letters Patent is hereby corrected as shown below:

On the title page, item (75), in "Inventors" in column 1, line 2, delete "Redmond" and insert -- Bellevue --, therefor.

On the title page, item (56), under "Other Publications" in column 2, line 3, after "Drives" insert -- , --.

On the title page, item (56), under "Other Publications" in column 2, line 5, delete "Issue" and insert -- Issues --, therefor.

On page 2, item (56), under "Other Publications" in column 1, line 4, delete "Sofeware" and insert -- Software --, therefor.

In column 6, line 54, delete "maybe" and insert -- may be --, therefor.

In column 10, line 22, after "vice-versa)" insert -- . --.

Signed and Sealed this

Twenty-second Day of September, 2009

David J. Kappos
*Director of the United States Patent and Trademark Office*